United States Patent [19]
Gelinas

[11] 4,105,346
[45] Aug. 8, 1978

[54] LOCKING SYSTEM FOR TELESCOPING MEMBERS

[75] Inventor: Ralph J. Gelinas, Northridge, Calif.

[73] Assignees: Grayson, Gross, Friedman, Phillips and Rasch; Singer, Lewak, Greenbaum and Goldstein, both of Los Angeles, Calif. ; by Ralph J. Gelinas, a part interest to each

[21] Appl. No.: 838,928

[22] Filed: Oct. 3, 1977

[51] Int. Cl.² .............................................. F16B 7/14
[52] U.S. Cl. .................................... 403/104; 403/352
[58] Field of Search ......... 403/351, 352, 104, DIG. 8; 248/412, 411, 188.5

[56] References Cited

U.S. PATENT DOCUMENTS

| | | | |
|---|---|---|---|
| 573,695 | 12/1896 | Penfield | 403/DIG. 8 |
| 1,568,296 | 1/1926 | Schleicher | 403/DIG. 8 |
| 2,339,615 | 1/1944 | Castelli | 403/342 |
| 2,871,044 | 1/1959 | Peterson | 403/352 |

*Primary Examiner*—Andrew V. Kundrat
*Attorney, Agent, or Firm*—Harvey S. Hertz

[57] ABSTRACT

A locking system which enables a pair of telescoping members to be slidably movable with respect to each other and locked in a pre-determined position. The outer telescoping leg is generally of cylindrically configuration and has an aperture therein. A sleeve, also having an aperture formed therein, is rotatable about the outer surface of the outer leg. A brake lug is positioned in the leg aperture and the sleeve aperture is of tapered thickness about the leg axes. Rotation of the sleeve about the outer leg causes the brake lug to press against the outer surface of the inner leg and prevents the legs from moving along the leg axes.

4 Claims, 4 Drawing Figures

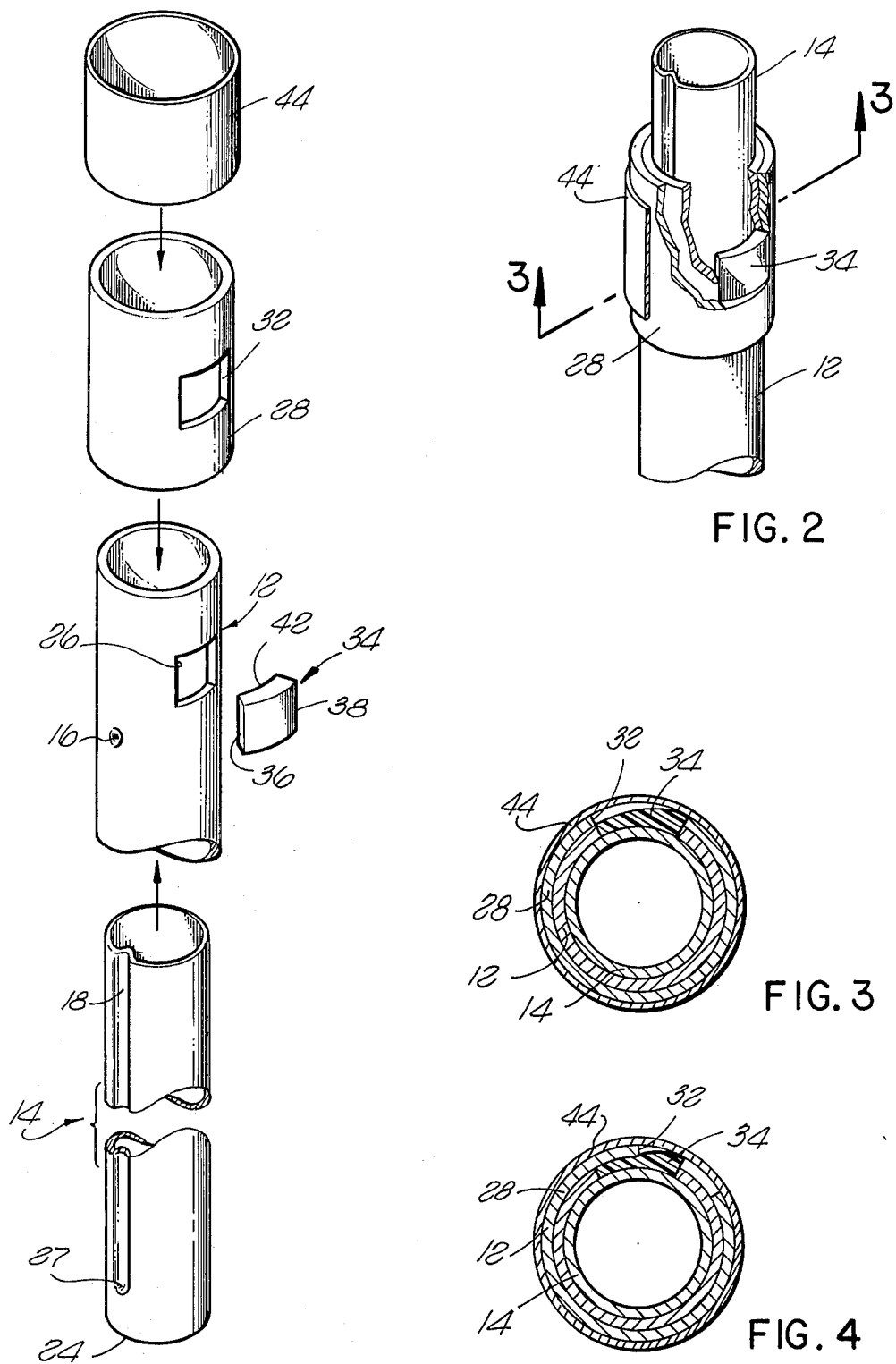

LOCKING SYSTEM FOR TELESCOPING MEMBERS

BACKGROUND OF THE INVENTION (1) Field of the Invention

The field of art to which the invention pertains includes the field of telescopic leg locking systems.

(2) Description of the Prior Art

Conventional locking systems for telescoping members utilize either a positive type locking system or a continuously adjustable locking system. In the positive type system, the telescoping members can be adjusted at periodically spaced points along the axes of both legs. A typical arrangement utilizes a pin which passes through apertures in both of the telescoping members. The disadvantage in such an arrangement is that the telescoping members can only be adjustable in length at fixed periodic intervals.

Continuously adjustable systems typically utilize an offset cam member. Rotation of the cam member causes the telescoping legs to lock in a predetermined position. Such devices, however, have been found to tend to freeze or lock after prolonged or continued use.

Known prior art includes U.S. Pat. Nos. 2,871,044; 3,419,293; 2,546,157; 3,724,885; 2,873,129; 648,461; 2,517,700; 2,850,308; 2,910,315; 64,292; 272,315; 458,580; 760,598; 1,915,669; and 3,920,342.

The present invention provides a novel, yet relatively simple locking system for a pair of continuously adjustable telescoping legs. The generally symmetrical arrangement of the system prevents locking or freezing.

SUMMARY OF THE INVENTION

A locking system for securing a pair of telescoping members in a predetermined position. An outer telescopic leg of generally cylindrical configuration and an inner telescoping leg are slidably movable with respect to each other along the leg axes. The outer telescopic leg has an aperture formed therein. A sleeve is positioned about the outer surface of the outer leg and is rotatable about the outer leg. The sleeve has an aperture formed therein. A brake lug is positioned in the leg aperture and the sleeve aperture. The brake lug has a thickness which is tapered about the leg axes. Rotation of the sleeve about the outer leg causes the brake lug to press against the outer surface of the inner leg and prevents the legs from being movable with respect to each other along the leg axes.

The advantages of this invention, both as to its construction and mode of operation, will be readily appreciated as the same becomes better understood by reference to the following detailed description when considered in connection with the accompanying drawings in which like reference numerals designate like parts throughout the figures.

BRIEF DESCRIPTION OF THE DRAWINGS

FIG. 1 is an exploded perspective view of the locking system;

FIG. 2 is an assembled view, partly in section of the locking system of FIG. 1;

FIG. 3 is a cross-sectional view of the locking system of FIG. 2 taken along the line 3—3 of FIG. 2 with the legs in an unlocked position; and FIG. 4 is a cross-sectional view taken along the line 3—3 of FIG. 2 with the legs in a locked position.

DESCRIPTION OF THE PREFERRED EMBODIMENTS

Referring now to the drawings, there is shown in FIG. 1 an exploded perspective view of the locking system for securing an outer telescopic leg 12 to an inner telescopic leg 14. The outer telescoping leg 12 and the inner telescoping leg 14 each have a concentric axis and are movable with respect to each other along these axes. The legs 12 and 14 are normally of a generally cylindrical configuration.

To prevent the legs from separating when in a maximum telescopic position, a dimple 16 is formed on the interior surface of the outer telescoping leg 12 and is movable along a slot 18 formed in the inner telescoping leg 14 exterior surface. With the legs 12 and 14 in the maximum telescoping position, the dimple 16 abuts a shoulder 27 formed at the end of the slot 18, adjacent to one end 24 of the inner telescoping leg 14, thus preventing separation of the legs.

To facilitate the locking of the telescopic legs 12 and 14 in a predetermined position an outer telescoping leg aperture 26 is formed in the leg 12. The aperture 26 is of generally square configuration and has two surfaces parallel to the axis of the outer telescoping leg 12 and two surfaces normal thereto. A cylindrical sleeve 28 is positioned over the outer telescoping leg. The inner diameter of the sleeve 28 has a dimension slightly greater than the outer diameter of the outer telescoping leg 12 enabling the sleeve to be rotated about the leg.

The sleeve 28 contains a sleeve aperture 32 whose dimensions are generally identical to that of the leg aperture 26.

Referring now to FIG. 2, the sleeve 28 is positioned over the outer telescoping leg 12 so that the apertures 26 and 32 are aligned with each other. Then a brake lug 34 is positioned in the sleeve apertures. The brake lug 34 has planar dimensions such that it is almost equal to the dimensions of the leg aperture 26 and the sleeve aperture 32. The brake lug has a tapered curved surface in a direction about the leg axes.

At the thin end 36 of the brake lug 34, the thickness thereof is approximately equal to the thickness of the outer telescopic leg 12 and the end 36 abuts the leg aperture 26 surface parallel to the leg axes.

The thick end 38 of the tapered brake lug 34 has a thickness equal to the thickness of the outer telescoping leg 12 and the sleeve 28. Thus, when the brake lug is positioned in the leg aperture 26 and the sleeve aperture 32, the sleeve 28 and the outer telescoping leg 12 are locked with respect to movement along the leg axis.

The interior surface 42 of the brake lug 34 has a radius of curvature along the tapered direction approximately equal to the radius of curvature of the inner telescoping leg 14 outer surface. Thus, when the brake lug 34 is positioned in the apertures 26 and 32, the surface 42 abuts the outer surface of the inner telescoping leg 14. A capping cover 44 is positioned over the sleeve 28 after the brake lug 34 has been positioned in the apertures 26 and 32. The capping cover 44 can be crimped or otherwise secured to the sleeve 28 and prevents the brake lug from falling out of the apertures 26 and 32.

Referring now to FIG. 3, the cylindrical sleeve 28 is shown in a position wherein the telescoping legs 12 and 14 are movable with respect to each other. In this position, the aperture 26 and 32 are aligned with respect to each other. Upon rotation of the cylindrical sleeve 28 in a clockwise direction, the inner surface of the cylindrical sleeve 28 abuts the outer surface of the brake lug 34. As shown in FIG. 4, the brake lug 34 presses against the inner telescoping leg 14 outer surface, preventing the outer telescoping leg 12 and inner telescoping leg 14 from moving with respect to each other.

To unlock the telescoping legs 12 and 14, the sleeve 28 is rotated in a counter-clockwise direction until the sleeve aperture 32 abuts the surface 38 of the brake lug 34. In this position, the cylindrical sleeve 28 can no longer be rotated, and the telescoping legs are once again free to move with respect to each other.

Further, it should be understood that the system could be also used with additional locking sections when more than two telescoping members are joined. Typically, the telescoping legs 12 and 14, the sleeve 28 and cover 44 are made of aluminum or steel, although other materials could be used as well. In one embodiment the brake lug was made of nylon to minimize wear between adjacent moving surfaces. Alternatively, the brake lug could be made of Teflon, rubber coated metal, or other materials.

I claim:

1. A locking sleeve for a pair of telescoping members comprising:
   an outer telescoping leg of general cylindrical configuration and an inner telescoping leg, at least a portion of said inner leg being located within said outer leg, at least one of said legs being slidably movable with respect to the other leg along the leg axes, said outer telescoping leg having an aperture therein;
   a sleeve positioned about the outer surface of said outer telescoping leg and rotatable about said outer leg, said sleeve having an aperture formed therein;
   a brake lug positioned in said apertures and having a tapered thickness about said leg axes, said brake lug tapering from a thickness approximately equal to the thickness of said outer telescoping leg to a thickness greater than said outer telescoping leg, and wherein rotation of said sleeve about said outer leg causes said lug to press against said outer surface of said inner leg and prevents said leg from being movable with respect to each other along the leg axes.

2. A locking system in accordance with claim 1 wherein a capping cover is secured over said sleeve aperture for preventing said brake lug from falling out of said apertures.

3. A locking system in accordance with claim 1 wherein said leg aperture and said sleeve aperture are of approximately identical dimensions and said brake lug forms a tight fit when positioned in said apertures.

4. A locking system in accordance with claim 3 wherein said brake lug tapers from a minimum thickness approximately equal to the thickness of the outer leg cylinder wall to a maximum thickness of approximately the thickness of the outer telescoping leg wall and said sleeve wall.

* * * * *